United States Patent [19]

Levefelt

[11] 4,183,417
[45] Jan. 15, 1980

[54] ROLLER BIT SEAL EXCLUDED FROM CUTTINGS BY AIR DISCHARGE

[75] Inventor: Bert G. Levefelt, Sandviken, Sweden

[73] Assignee: Sandvik AB, Sandviken, Sweden

[21] Appl. No.: 892,866

[22] Filed: Apr. 3, 1978

[30] Foreign Application Priority Data

Apr. 1, 1977 [SE] Sweden .................................. 7703810

[51] Int. Cl.² .......................... E21C 13/00; E21B 9/10
[52] U.S. Cl. ..................................... 175/339; 175/372; 308/8.2
[58] Field of Search ........ 175/337, 339, 340, 369–372; 308/8.2

[56] References Cited

U.S. PATENT DOCUMENTS

| 1,945,240 | 1/1934 | Tupica | 175/340 X |
| 2,814,464 | 11/1957 | Pike et al. | 175/337 |
| 3,921,735 | 11/1975 | Dysart | 175/337 |
| 4,102,419 | 7/1978 | Klima | 175/371 |

FOREIGN PATENT DOCUMENTS 2736711  3/1978  Fed. Rep. of Germany .......... 175/372

Primary Examiner—Ernest R. Purser
Assistant Examiner—Nick A. Nichols, Jr.
Attorney, Agent, or Firm—Harold L. Stults

[57] ABSTRACT

A rotary roller bit for drilling earth and rock formations, having a main body and three legs extending outwardly therefrom. Each of the legs carries a conical roller cutter with internal bearings and there is a seal around the periphery of the top of the roller cutter. The periphery of the roller cutter is spaced from the adjacent portion of the leg so as to provide a jet slot for the discharge of air. Adjacent the slot and radially inwardly is an air chamber which is formed between an annular surface of the leg and a seal ring. The air chamber is substantially greater in its dimension axially of the roller cutter and air is supplied to it under sufficient pressure to cause a jet of air to flow from the jet slot at a sufficient rate to prevent the entry of rock particles and dirt into the roller cutter.

6 Claims, 1 Drawing Figure

U.S. Patent
Jan. 15, 1980
4,183,417
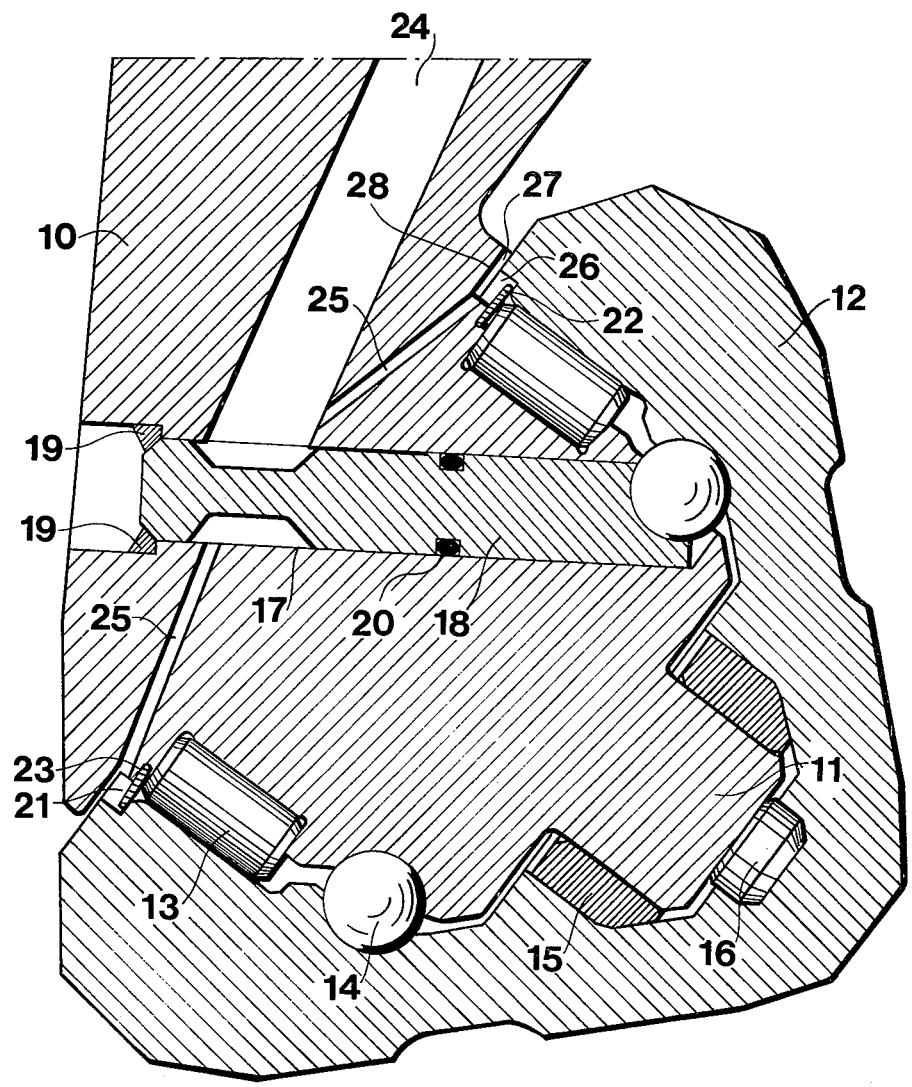

ROLLER BIT SEAL EXCLUDED FROM CUTTINGS BY AIR DISCHARGE

This invention is concerned with improved seal means for a rotary roller bit of the kind comprising a body, a number of integral legs extending inwardly therefrom, the lower parts of which form bearing pins upon which roller cutters are rotatably mounted, a bearing system supporting said cutters on said bearing pins, and seal means provided between each of the roller cutters and its bearing pin.

In accordance with the present invention, a rotary roller bit of the aforementioned type is adapted to be mounted at the lowermost part of a rotary drill string. When rotating such a drill string, the roller bit breaks up earth and rock formations so as to produce a bore hole. The roller bit usually compises three separate legs which extend donwardly and angularly in relation to the main body, the lowermost portion of each leg being provided with the bearing pin on which the cutter cone is rotatably mounted. A separate bearing system facilitates the rotation and comprises roller bearings, ball bearings, and friction bearings or a combination thereof. Various types of seal means have been used between the roller bit and the leg upon which a roller bit is mounted.

With prior roller bits, air is circulated under pressure through the bit whereby some portion of the air is directed through the bearing system for cooling purposes. Excess pressure is then provided in the bearing system for the purpose of preventing foreign particles from entering thereinto and causing damage. Additional air is used for carrying the crushed rock from the drill bit to the entry of and from the bore hole.

In sealed roller bits, air is circulated under pressure primarily for carrying away the crushed rock formations and to a minor extent for the purpose of cooling the drill bit. When using this type of drill bits there is an apparent need of improved seal means between each roller cutter and bearing pin upon which said roller cutter is rotatably mounted.

It is an object of the present invention to provide an improved means for sealing the roller cutter lubrication system in sealed roller bits. The basic concept of the invention is that by providing an air barrier in a narrow space between the leg of the bit and the roller cutter. It is then possible to effectively protect a seal between the leg and the roller cutter from being damaged. By providing a narrow space of suitable height, it has been found possible to provide sufficiently high pressure within said space that an effective barrier of air under pressure is provided as an assistance to the seal means provided for the roller cutter lubrication system. This eliminates the risk of dirt and rock particles penetrating into the barrier system of the roller cutter, thus improving the drilling life of the bearings and the drill bit.

The invention will now be described in greater detal with reference to the accompanying drawing which is an axial section through one of the roller cutters of a bit according to a preferred embodiment of the invention.

Referring to the drawing, there is provided a rotary roller bit for drilling in rock and earth formations, which comprises three separate legs internal with a bit main body with the legs extending inwardly and angularly from the main body. For reasons of clarity, only one leg 10 is illustrated in the drawing. The lowermost part of the leg 10 has an integral bearing pin 11 upon which a conical roller cutter 12 is rotatably mounted. A plurality of inserts (not shown) are mounted in the somewhat frusto-conical mantle surface of the roller cutter so as to break up and crush rock formations when the drill bit is rotated and moved downwardly in the hole being drilled.

The bearing means which provides for the rotation of the roller cutter comprises a system of roller bearings 13, a system of ball bearings 14, a friction bearing 15, and an axial bearing 16. For the purpose of introducing and retaining the individual ball bearings in the ball bearing system 14, a ball loading bore 17 is provided in leg 11 and filled with a plug 18 when the balls are in place. Plug 18 is welded in position in the bore 17 by welds 19. For the purpose of completely sealing the roller cutter, an O-ring 20 is positioned around plug 18 to seal bore 17.

The entry of solid particles between the roller cutter and the bearing pin is prevented by an annular seal in the form of a flat ring or plate between the open end of the roller cutter and the bearing pin. The outer edge of seal 21 is positioned on an abutment formed by an annular recessed surface 22 at the open end of the roller cutter, and the inner edge of the seal is positioned between an abutment shoulder 23 on bearing pin 11 at the juncture between the bearing pin and leg 10.

The upper surface of seal 21 which extends beyond shoulder 23 is coextensive with an annular surface 28 of leg 10 and between those two surfaces is an air chamber 26. Radially outwardly from air chamber 26 is an annular gap or jet slot 27 which is formed between coextensive annular surfaces of the leg and the roller cutter. The radial dimension of jet slot 27 is substantially less than the radial dimension of air chamber 26. Air under pressure is supplied through a bore or passageway 24 in leg 10 to a central zone adjacent the juncture of leg 10 and pin 11. A plurality of bores or passageways 25 extend from the lower end of passageway 24 radially outwardly with respect to the roller cutter to air chamber 26. Hence, the air supply through passageway 24 is delivered to the annular air chamber 26 and is discharged therefrom in a jet stream from jet slot 27. The axial dimension of air chamber 26 is substantially greater than that of slot 27 so that the cross-sectional dimension of the path of the air flow is substantially restricted as the air passes from the air chamber so as to produce an effective jet effect in the air flow. The total of the cross-sections of passageways 25 and the cross-section of passageway 24 are both in excess of the cross-section of jet slot 27, so that they do not provide an effective restriction to the flow of air from jet slot 27.

The air jet flowing from the jet slot effectively prevents the entry of solids between the roller cutter and the bearing pin and the outward radial flow of air through air chamber 26 sweeps the exposed top surface of seal 21.

It has been found that the air barrier system described above continues to function properly when the bearings are appreciably worn and even when the surfaces of seal 21 have become worn. Furthermore, the seal construction does not reduce the effective functioning of the bearing system.

It should be noted that it is advantageous to direct the air supply passageway 24 to a position adjacent the juncture between leg 10 and pin 11. In another embodiment of the invention, channel 24 has an angular portion at its discharge end so that the air is discharged substantially coaxially with the axis of pin 11 and then passes radially to jet slot 27.

It is understood that modifications can be made in the illustrative embodiment and that other embodiments may be provided, all within the scope of the claims.

What is claimed is:

1. A roller bit having a main body and a plurality of roller cutter assemblies, each of which is mounted upon a downwardly extending leg and a bearing pin which extends downwardly and radially inwardly from the leg, each of said cutter assemblies comprising, a roller cutter mounted upon said pin with there being an annular space between said pin and said roller cutter, a plurality of bearings positioned within said annular space and supporting said roller cutter upon said pin to rotate about a predetermined axis, said leg and the periphery of said roller cutter forming an annular gap between annular surfaces of said leg and the periphery of said roller cutter, said annular space including an air chamber adjacent and of greater axial dimension than said annular gap, said leg including a first passageway and a plurality of branch passageways extending from the first-named passageway and spaced equally around said pin for air which is delivered to said air chamber whereby the air is discharged from said annular gap radially outwardly with respect to said axis, said air chamber having a cross-section transverse to the direction of air flow to produce a jet effect for the air being discharged from said annular gap, and a seal separating said air chamber from the remainder of said annular space.

2. A roller bit as described in claim 1 wherein said seal comprises an annular plate having its edge nearest said axis positioned beneath a shoulder on said pin and its other edge providing one surface of said air chamber.

3. A roller bit as described in claim 1 wherein the cross-section of the path of air flow through said passageway and to said annular gap is greater than the cross-section of said annular gap.

4. A roller bit as described in claim 1 or 3 wherein said first-named passageway extends to a zone adjacent said axis at the juncture of said leg and said pin.

5. A roller bit having a main body and a plurality of roller cutter assemblies, each of which is mounted upon a downwardly extending leg and a bearing pin which extends downwardly and radially inwardly from the leg, each of said cutter assemblies comprising, a roller cutter mounted upon said pin with there being an annular space between said pin and said roller cutter, a plurality of bearings positioned within said annular space and supporting said roller cutter upon said pin to rotate about a predetermined axis, said leg and the periphery of said roller cutter forming an annular gap between annular surfaces of said leg and the periphery of said roller cutter, said annular space including an air chamber adjacent and of greater axial dimension than said annular gap, said leg including a first passageway and a plurality of branch passageways extending from the first-named passageway for air which is delivered to said air chamber whereby the air is discharged from said annular gap radially outwardly with respect to said axis, said air chamber having a cross-section transverse to the direction of air flow to produce a jet effect for the air being discharged from said annular gap, and a seal separating said air chamber from the remainder of said annular space.

6. A roller bit having a main body and a plurality of roller cutter assemblies, each of which is mounted upon a downwardly extending leg and a bearing pin which extends downwardly and radially inwardly from the leg, each of said cutter assemblies comprising, a roller cutter mounted upon said pin with there being an annular space between said pin and said roller cutter, a plurality of bearings positioned within said annular space and supporting said roller cutter upon said pin to rotate about a predetermined axis, said leg and the periphery of said roller cutter forming an annular gap between annular surfaces of said leg and the periphery of said roller cutter, a seal separating said annular gap from said annular space, said leg including a passageway for air which is delivered to said annular gap whereby the air is discharged from said annular gap radially outwardly with respect to said axis while being prevented from entering said annular space due to said seal.

* * * * *